June 3, 1941.  W. F. UPTON  2,244,409
CAMERA MOUNTING FOR DENTAL BRACKET TABLES
Filed May 24, 1940
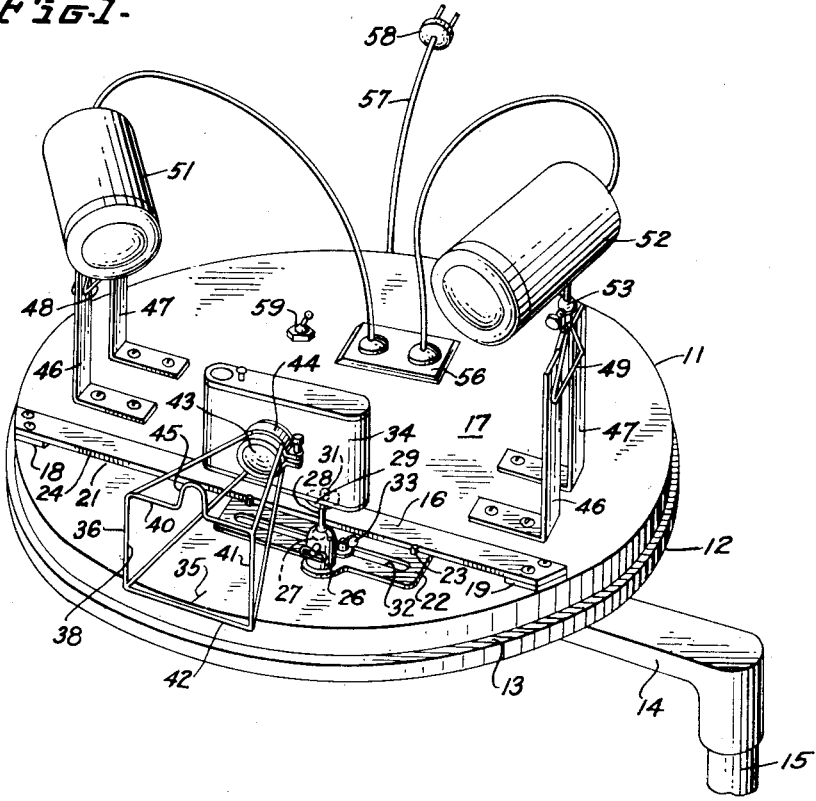
Fig.1-
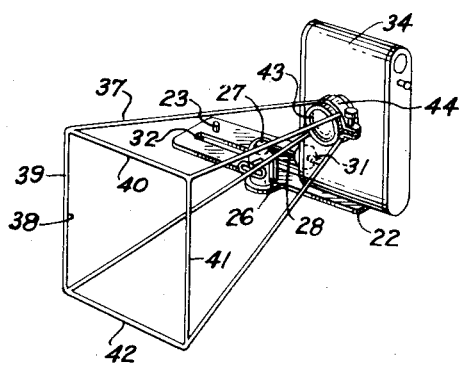
Fig.2-
INVENTOR.
WILLIAM F. UPTON
BY
ATTORNEY.

Patented June 3, 1941

2,244,409

UNITED STATES PATENT OFFICE 2,244,409

CAMERA MOUNTING FOR DENTAL BRACKET TABLES

William F. Upton, San Anselmo, Calif.

Application May 24, 1940, Serial No. 337,007

1 Claim. (Cl. 248—179)

The invention, in general, relates to the unification of dental equipment. More particularly, the invention relates to means for facilitating the photographing of a patient's teeth, jaw structure, complete face, or any desired portion of the face.

In order that more efficacious dental work can be done with respect to any given tooth condition or denture requirement, the modern dentist has adopted the practice of making photographic reproductions, generally enlargements, of a patient's teeth arrangement, bone structure and the like so that after a patient has left the office and while the dentist is at leisure, he may make a careful analysis from the clear, accurate sharp-line reproductions and reach a more considered conclusion as to the character and extent of work that should be done to alleviate the condition, rather than relying upon memory or haphazard measurements. In general, such photographic work has not, heretofore, been carried out under favorable conditions as to lighting, camera focusing or general handling of the camera with the result that either dim, distorted or blurred pictures are obtained. Moreover, considerable time frequently is lost in locating and setting up cameras.

A primary object of my invention is to provide a camera mounting unit for dentists which is adapted to be removably seated rigidly upon a dental bracket table.

Another object of the improvement is to provide a unitary structure attachable to a dental bracket table for adjustably mounting and focusing a camera, as well as for adjustably mounting of illumination means.

A still further object of the invention is to provide an improved camera mounting of the indicated nature which is further characterized by the provision of means affording not only universal movement of the camera but movement thereof laterally with respect to a subject to insure rapid and accurate focusing.

Another object of my invention is to provide a camera mounting of the indicated nature which is characterized by its compactness and simplicity.

A still further object of the invention is to provide a unitary camera mounting for application to a dental bracket table which is relatively inexpensive to manufacture and relatively easy to set up and take down.

The foregoing and other objects of the invention are attained in a preferred embodiment thereof which is illustrated in the accompanying drawing. It is to be understood that I am not to be limited to the precise embodiment nor to the precise arrangement of elements illustrated, as my invention, as defined in the appended claim, can be embodied in a plurality and variety of forms.

Referring to the drawing:

Figure 1 is a perspective view of a preferred embodiment of my invention as disposed on a dental bracket table.

Figure 2 is a perspective view of a detail of the preferred embodiment of the invention.

In its preferred form, the camera mounting for dental bracket tables of my invention preferably comprises a base of substantially the dimensions of the upper surface of a dental bracket table bounded by the rim thereof; said base being adapted to be removably seated rigidly on said table surface within said rim, a strip fastened to the upper surface of said base in spaced relationship thereto to define a recess, a member slidable in said recess laterally of said base, a camera mounted for universal movement on said slidable member, an upright on each side of said base, and means removably attached to said uprights for illuminating a subject to be photographed by said camera.

As illustrated in Figure 1 of the drawing, I provide a base 11 which may be fabricated of a wood, a phenolic condensate or a metal, as desired, and which is adapted to be removably seated rigidly upon the upper surface of a dental bracket table 12 of the conventional type wherein the upper surface is bounded by an upstanding rim 13. With the base 11 seated on the upper surface of the table, the rim or periphery of base 11 abuts the rim 13 entirely around its inner surface to rigidly hold the base on the table surface within rim 13 thereof. The dental bracket table 12, being of the conventional type, is swingably mounted by means of a link 14 hinged to a standard 15. It is understood, of course, that the base 11 can be formed to any shape and dimensions desired, the only requirement being that it fit within the rim of the table on its upper surface.

In accordance with my invention, I fasten a strip 16 to the upper surface 17 of base 11, the strip preferably being fabricated of a chromium-plated metal and being fastened in spaced relationship to the base by means of spacing members 18 and 19 therebetween. The elevated mounting of strip 16 on base 11 affords a recess 21 therebetween extending across the top of the base between the spacing members 18 and 19, as clearly indicated in Figure 1 of the drawing. Recess 21 receives a slidable member 22, which also is preferably fabricated of a chromium-plated metal, and which is shorter in length, of course, than the length of recess 21 so that the member 22 may slide therein laterally of the base between the spacing members 18 and 19. The slidable member 22 may conveniently be provided with guide studs 23 engaging the substantially straight forward edge 24 of the strip 16. Slidable member 22 is slightly enlarged and provided with an aperture for passing a threaded stud fitted in base 11 upon which may be secured a universal joint connection member 26 of the conventional type, obtainable in the open market, which includes a socket for the reception of a ball 27, as indicated by the dotted line showings of Figure 2, carried on a threaded stem 28. The stem 28 carries a disk 29 from which extends a threaded stud 31. Moreover, the slidable member 22 is formed with a slot 32 therein for passing a threaded stud fitted to base 11 and upon which a wing-nut 33 may be screwed for clamping the slidable member 22 to the base in any desired position to which it is shifted.

It will be clear from the showings of Figures 1 and 2 that universal connection member 26 serves as the essential mounting element for a camera 34, the member 26 permitting disposal of the camera with its long axis either in a horizontal position or vertically disposed depending upon the character of picture desired. As is well known, every camera is provided with a threaded opening in order to mount the same on a threaded stud provided on all tripods or like instruments, and in this case, for mounting on threaded stud or stem 31 extending above the disc 29 of the universal joint connection member 26. Not only is there afforded a universal mounting of the camera 34 for taking long axis pictures either vertically or horizontally, but the provision of slidable member 22, on which the universal joint connection member 26 is carried, affords lateral adjustment of the camera with respect to the subject. To the end that the camera can readily and quickly be aligned with the center of a subject to be photographed, a line 35 is delineated on upper surface 17 of the base 11 in front of slidable member 22 so that the camera lens can be aligned therewith by sliding member 22 laterally of the base.

To the end that the image or subject be clearly and sharply defined, centered, outlined and brought properly into focus, I provide a plurality of focal and centering frames 36 and 37 of different sizes and different focal lengths, for removable attachment to the lens of the camera. Each focal and centering frame is so constructed as to define a focal area or plane 38 at the front thereof, bounded by sections 39, 40, 41 and 42 of the frame which are placed against the face of the patient or subject. The smaller size frame 36 preferably includes a loop 45 on the top leg 40 thereof for bridging the nose, and has been successfully used in taking a photograph with the long axis of the camera horizontally disposed, as shown in Figure 1, and is generally used for taking pictures of portions of the face, such as the teeth or jaw bone. Thus, the smaller size focal frame 36 has a smaller focal area or plane 38 than the larger focal frame 37 which is used in taking a photograph of the entire face with the camera with its long axis vertically disposed. I have found it desirable and effective to use an auxiliary magnifying lens 43 with the focal frames 36 and 37, these auxiliary lens 43 being conveniently supported at the inner end of the frames in bases 44 which carry clutch members for slipping over the frame of the ordinary lens of the camera. Any number of different sizes of focal and centering frames can be supplied but I have found in practice that only two different sizes of focal frames are needed for effective photography. In order to facilitate the making of enlargements with a projection unit, I preferably attach a graduated scale to one leg, such as the leg 39 of the focal and centering frames; the scale being readily compared with a suitable rule for making enlargements to actual size.

In order that the subject be properly illuminated, rather than depending upon overhead clusters of lights or natural lighting, I preferably provide in my unitary structure means for mounting any desired size lamps. These means comprise a pair of uprights 46 and 47 on each side of the base 11 to the rear of strip 16 and conveniently may take the form of angles each having one leg thereof fastened securely to the base. As shown, the angles constituting the uprights 46 and 47 are arranged in pairs and in spaced relationship and removably receive clamps 48 and 49, respectively, fastened to lamps 51 and 52. Each lamp is mounted on a universal joint 53 for enabling adjustment thereof to direct light in any desired direction. Preferably, each of the lamps are the so-called photo-flood type which are commercially available. Suitable electrical conductors and plugs are supplied with the lamps for insertion into sockets, not shown, mounted in base 11 and covered by plate 56. A relatively long conductor 57 carrying a suitable plug 58 for insertion into a floor plug or socket also is provided, the conductor 57 leading to the sockets mounted in base 11. If desired, a suitable switch 59 may be interposed in the circuit and be supported on the base 11.

It will be appreciated from an inspection of the drawing that the hereinabove described unitary structure can be lifted on and off of bracket table 12 by grasping and holding the uprights 46 and 47. The structure is as easily set up as it is to take down, requiring but a few seconds, and it is only a matter of a few additional seconds to install the proper focal frame 36 or 37 on the camera lens and align the camera 31. The base 11, being rigidly supported by rim 13 of the bracket table, is not subject to movement relative to the camera so that the resultant photograph is not blurred or distorted. The lamps 51 and 52 can be left on the uprights, if desired, or taken down readily for other use, and the whole unit is so compact that it fits easily on a closet shelf out of the way.

It is to be understood that the appended claim is to be accorded a range of equivalents commensurate in scope with the advance made over the prior art.

I claim:

A camera mounting for a dental bracket table having an upper surface bounded by an upstanding rim, said camera mounting comprising a base of substantially the dimensions of said upper surface of the bracket table removably seated on said surface and having its rim in engagement with the rim of said table, a strip fastened to the upper surface of said base in spaced relationship thereto to define a recess therebetween, a member slidable in said recess, and a universal joint connection member on said slidable member, said universal joint connection member being adapted to removably receive a camera.

WILLIAM F. UPTON.